Figure 1:
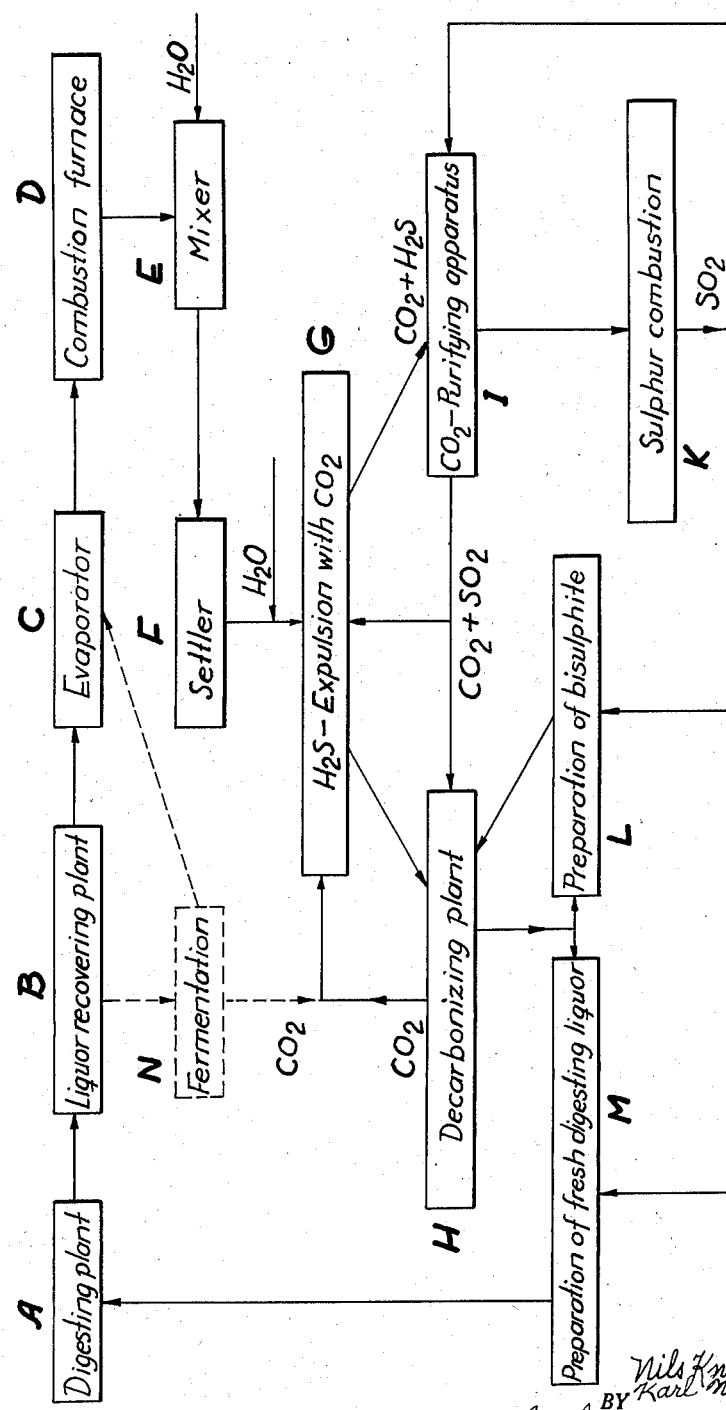

INVENTOR.
Nils Knut Gabriel Ahlborg
Karl Nicolaus Cederquist
BY
Cushman, Darby & Cushman
Attorneys

INVENTORS
NILS KNUT GABRIEL AHLBORG
BY KARL NICOLAUS CEDERQUIST

United States Patent Office 2,909,407
Patented Oct. 20, 1959

2,909,407

METHOD IN THE RECOVERY OF ALKALI AND SULPHUR BY CARBONIZATION OF MELT SODA SOLUTIONS OBTAINED IN THE MANUFACTURE OF CELLULOSE

Nils Knut Gabriel Ahlborg and Karl Nicolaus Cederquist, Falun, Sweden, assignors to Stora Kopparbergs Bergslags Aktiebolag, Falun, Sweden, a corporation of Sweden Application February 14, 1956, Serial No. 565,472

Claims priority, application Sweden September 9, 1955

6 Claims. (Cl. 23—129)

The present invention for the recovery of the chemicals out of waste lyes from the manufacture of cellulose by digesting ligno-cellulose-containing materials, such as wood, straw and peat-moss, with alkaline sulphite and/or alkaline bisulphite or bisulphite and free $SO_2$ in one or more steps is applicable in all those cases where the waste lye obtained contains ligno-sulphonates of alkaline metals, such as sodium ligno-sulphonate.

If such sodium-containing waste lyes are evaporated entirely or in part, for instance nearly to dryness or to a dry percentage of 40–60%, and are combusted in a soda house unit, a melt soda is obtained which substantially consists of soda, sodium sulphide and smaller quantities of sodium sulphate, sulphite and thiosulphate.

It is known since long ago to recover the sulphide sulphur out of solutions of this melt soda in a process, where carbonic acid or carbonic acid-containing gases are conveyed in a column apparatus or scrubber in a counter current to the solution, the soda of the solution and sodium hydroxide formed in the hydrolysis of the alkaline sulphide being transferred into bicarbonate reacting with sodium sulphohydrate formed in the hydrolysis at the liberation of hydrogen-sulphide, discharged from the solution with the escaping gas mixture. The mixture of hydrogen sulphide gas may be recovered and the hydrogen sulphide combusted to $SO_2$, which is recovered. The solution relieved of sulphide sulphur may be converted with $SO_2$ in a gaseous state or an aqueous solution or with bisulphite solution, with or without free $SO_2$, free and bound carbonic acid then escaping in a gaseous state (decarbonization) and a sulphite soluton beng obtaned, which permits of being treated further into sulphite digesting liquor. The carbonic acid is used for the expulsion of another quantity of sulphide sulphur.

To bring about a perfect sulphite digesting liquor in a process of this kind, it is of material importance that the percentage of thiosulphate in the solution is not increased appreciably during the progress of the process, inasmuch as too high a percentage of thiosulphate in the sulphite digesting liquor may lead to a more difficult digestion to black liquor and, furthermore, to considerably increased corrosive attacks on conduits and fixtures. The percentage of thiosulphate also increases the digesting time in the manufacture of cellulose.

Thiosulphate may be formed either by the fact that the sulphide sulphur in a solution with a relatively high percentage of sulphide is oxidized by the oxygen at a contact with oxygen-containing gases, or by the fact that the carbonized and expelled solution still contains sulphide sulphur, which at the reaction with $SO_2$ or bisulphite in the decarbonizing step produces thiosulphate. Therefore, it has been found to be essential, first, that the expulsion of the sulphide sulphur be carried out with carbonic acid which is free from oxygen, preferably with carbonic acid of 100 percent, and, second, that the solution going to decarbonization be entirely, or nearly so, relieved of sulphide sulphur.

Previously known methods of expelling the sulphide sulphur with pure $CO_2$ and of recovering the sulphide sulphur out of melt soda solutions have not found any technical use by reason of the difficulty experienced in economically recovering that carbonic acid in a pure state and in sufficient quantity which escapes in large quantities with the hydrogen sulphur at the expulsion.

Experiments undertaken have shown that it is possible to obviate this difficulty and to recover the carbonic acid in a pure state and to recirculate the same in a simple and economical manner, so that any losses of carbonic acid occurring will be more than amply covered by the carbonate carbonic acid entering with the melt soda.

The present method involves that the sulphide sulphur is removed in the form of hydrogen sulphide from the melt soda solution and is recovered as sulphur by the solution being treated with pure carbonic acid in a first step, for instance by conveying the pure carbonic acid in a column apparatus or scrubber in a countercurrent to the solution in a quantity such that all or nearly all sulphide sulphur is expelled and escapes in the form of hydrogen sulphide in a mixture with carbonic acid flowing through the apparatus. The escaping gas mixture is relieved of its content of hydrogen sulphide in a second step by the gas mixture being brought into contact with sulphur dioxide and water or by the gas mixture being introduced in a mixture with sulphur dioxide into a contact furnace, the hydrogen sulphide then reacting in both cases with the sulphur dioxde while forming elemental sulphur and water according to the following formula:

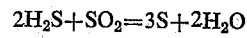

$$2H_2S + SO_2 = 3S + 2H_2O$$

The sulphur dioxide is here added in such a quantity, with or without a surplusage, that all hydrogen sulphide is transferred into sulphur, which is separated. Carbonic acid relieved of hydrogen sulphide, possibly with an added surplusage of sulphur dioxide, is recirculated to the first step, possibly via the decarbonizing step for the expelled solution coming from the first step, any added surplusage of sulphur dioxide then reacting with the bicarbonate of the escaping solution at the liberation of carbonic acid, which is used with the pure carbonic acid recovered from the gas mixture for the expulsion of another quantity of hydrogen sulphide in the first step.

From the solution relieved of sulphide and coming from the first step, said solution substantially containing bicarbonate, the carbonic acid is recovered in the preparation of the digesting liquor or in a special decarbonizing step, the carbonic acid being then liberated with sulphur dioxide and/or sodium bisulphite. The recovered carbonic acid is returned to the first step for carbonization and expulsion of another quantity of hydrogen sulphide.

At the reaction of the $CO_2$—$H_2S$-gas mixture with sulphur dioxide in an aqueous solution the hydrogen sulphide reacts with the sulphur dioxide substantially at the formation of water and elemental sulphur, which precipitates and stays in a suspended state in the solution, while the carbonic acid and any excess of sulphur dioxide passes further and recirculates, as described hereinabove. However, a smaller quantity of the sulphur compounds is transferred into the thiosulphuric acid and polythio-no-acids that stay in the solution. Upon separation of the free sulphur, the solution may be recirculated to the $CO_2$-purifying apparatus or should the percentage of thio-no-acids become higher than desirable, the solution may be transferred to the combustion furnace for the evaporated sulphite waste lye.

The sulphur precipitates in the aqueous solution in a form such that filtering or centrifugation is difficult to carry into effect. However, if the suspension is heated to the melting point of the sulphur, or above, the sulphur is separated in a liquid state and falls to the bottom, while a clear aqueous solution is obtained as an upper layer. The sulphur is drawn off and may be combusted into sulphur dioxide for the prepartion of digesting liquor and for relieving the circulating carbonic acid of hydrogen sulphide. The aqueous solution is recirculated to the $CO_2$-purifying apparatus. The separation of the sulphur may be carried out in batches or continuously.

At the reaction of the $CO_2$—$H_2S$-gas mixture with $SO_2$-gas in a contact furnace, the escaping gas is cooled and washed in known manner for the separation of sulphur that has formed, whereas the carbonic acid, with any excess of sulphur dioxide not converted passes further and recirculates, as above described.

At the expulsion of the sulphide sulphur in the first step, the temperature may be varied within wide limits, but in most cases it is believed to be the most advantageous to carry out the expulsion without any additional supply of heat, the temperature being then determined by the temperature of the entering melt soda solution, the exothermal heat and the circulating gas quantity.

The concentration of the melt soda solution entering the $H_2S$-expulsion apparatus should preferably be such that bicarbonate is not precipitated out of the solution, but the process is not limited to such concentrations. However, any precipitation of bicarbonate out of the solution entails the risk of clogging in conduits and apparatus.

At the reaction between the sulphur dioxide and hydrogen sulphide in an aqueous solution in the second step, the temperature may be varied within wide limits. Since the reaction is exothermal, no heat need be supplied to the reaction to make it proceed at an increased temperature.

The carrying of the method into effect will appear from the flow diagrams shown in the accompanying drawings and from the following description.

Figure 2:
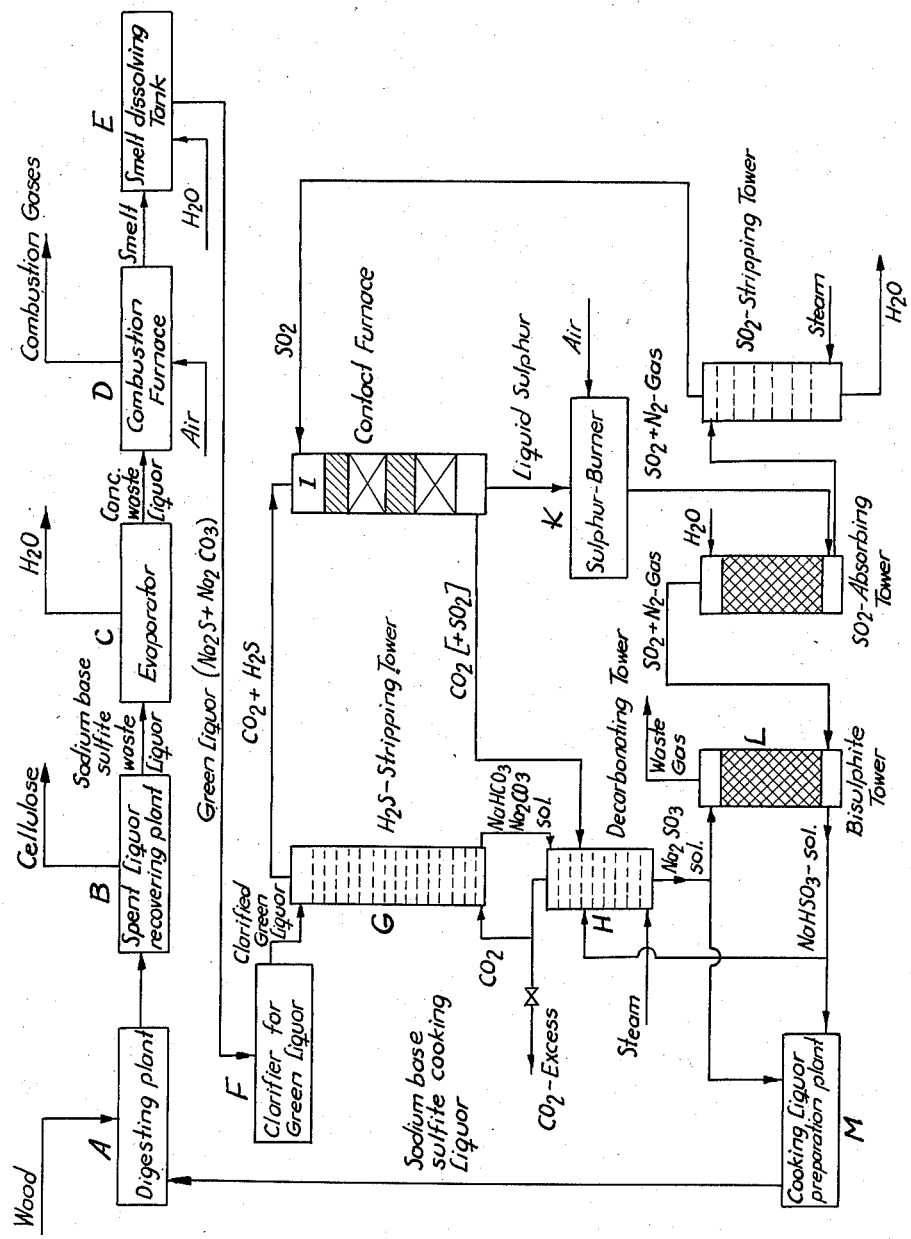

Figure 1 is a schematic flow sheet showing the general embodiments of the new process and Figure 2 is simply a more detailed version of the same flow pattern.

After the digesting process in the cellulose digesting plant A, the sulphite waste lye is recovered in the liquor recovering plant B, and is conveyed, possibly via the fermentation plant N, to the evaporating plant C, where it is evaporated to a dry percentage of approximately 50%, whereupon it is conveyed to the combustion furnace D, where all organic substance is combusted and remaining chemicals leave the furnace in the form of a melt containing substantially $Na_2S$ and $Na_2CO_3$ and smaller quantities of $Na_2SO_4$, $Na_2S_2O_3$ and $Na_2SO_3$. The melt is caused to flow down into the melt soda mixer E for dissolution in water. This solution is transferred to the settler F, where the solution is left to clear up for the removal of insoluble particles. From the settler F the solution is pumped in at the top of the hydrogen sulphide-expulsion apparatus G, where it meets pure carbonic acid in a counter-current, such carbonic acid coming from the decarbonizing plant H and the carbonic acid purifying apparatus I in a quantity such that all sulphide sulphur is expelled from the solution. The $CO_2$—$H_2S$-gas mixture escaping from the expulsion apparatus G goes to the $CO_2$-purifying apparatus I, whereas the solution coming from the bottom of the column and relieved of sulphide sulphur, such solution consisting substantially of bicarbonate, is transferred to the decarbonizing plant H, where $CO_2$ is liberated with $SO_2$ or Nabisulphite and is returned to the expulsion apparatus G. The decarbonized solution coming from H passes in part to L for the preparation of bisulphite for the decarbonizing plant H and in part to M for the preparation of fresh digesting liquor which returns to the digesting plant A.

In the $CO_2$-purifying apparatus I the entering $CO_2$—$H_2S$-gas mixture is relieved of $H_2S$ through the reaction with $SO_2$. The carbonic acid relieved of hydrogen sulphide returns, possibly in a mixture with a non-reacted excess of $SO_2$, to the decarbonizing apparatus H or to the bottom of the hydrogen sulphide expulsion apparatus G, where $SO_2$ is absorbed by outgoing bicarbonate solution at the liberation of $CO_2$, which together with the carbonic acid recovered from the gas mixture returns to the expulsion column G. The sulphur formed in the $CO_2$-purifying apparatus I through the reaction of the hydrogen sulphide with the sulphur dioxide is separated and transferred to the furnace K, where it is combusted to $SO_2$, which returns to the system. With this method the following advantages will be obtained.

(1) The carbonic acid is recovered in a pure state and in a quantity such that no carbonic acid need be supplied to the process from a separate source of carbonic acid, since any losses are more than amply covered by carbonate carbonic acid entering with the melt soda.

(2) Since no loss of carbonic acid occurs at the expulsion of the sulphide sulphur and the following purification of the carbonic acid, the flux of carbonic acid may be adapted with so ample a margin that a complete expulsion of the sulphide sulphur is obtained.

(3) Since the expulsion of the sulphide sulphur takes place all the time with pure carbonic acid free from oxygen, the formation of thiosulphate is very small, so that the treated melt soda solution is in its entirety serviceable for the preparation of fresh digesting liquor.

Although all sulphide sulphur in a melt soda solution can be expelled and recovered according to the invention, it is possible, and may in certain cases be found advantageous, first to expel a larger or smaller portion of the sulphide sulphur in any known manner, according to which it is possible to carry out a partial expulsion without any greater loss of carbonic acid than one that can be replaced by the carbonate carbonic acid of the entering melt soda, after which the residual sulphide sulphur is expelled and the chemicals are recovered according to the invention.

For example, the principal portion of the sulphide sulphur may be expelled by carbonization of the melt soda solution with $CO_2$ or $CO_2$-containing gases and subsequent expulsion of hydrogen sulphide under vacuum, with or without simultaneous expulsion of water vapour, whereupon the residual sulphide sulphur is removed and the chemicals are recovered according to the invention.

What we claim is:

1. A method for the preparation of alkali sulfite with a minimum of thiosulfate formation from alkali and sulfide sulfur recovered from a melt soda solution containing the same which comprises the steps of: (1) expelling sulfide sulfur from said solution as hydrogen sulfide in the form of a substantially oxygen-free gaseous mixture consisting essentially of hydrogen sulfide and carbonic acid by treating said solution with oxygen-free, substantially pure carbonic acid whereby a substantially sulfide-free solution is obtained; (2) reacting said gaseous mixture of hydrogen sulfide and carbonic acid with sulfurous acid whereby elemental sulfur and substantially sulfide-free carbonic acid are obtained; (3) directly recycling the thus obtained sulfide-free carbonic acid to step (1) for the treatment of additional melt soda solution and the expulsion of sulfide sulfur therefrom; (4) combusting said elemental sulfur to sulfur dioxide; and (5) utilizing said sulfur dioxide and the sulfide-free melt soda solution obtained in step (1) to form alkali sulfite.

2. The method of claim 1 wherein sulfurous acid and water are utilized in step (2) to recover said sulfide as elemental sulfur.

3. The method of claim 2 wherein said elemental sulfur is obtained as a suspension in water, and said suspension is heated under pressure at least to the melting point of the sulfur whereby the sulfur and water form strata, the liquid sulfur being thereafter separated from the water.

4. The method of claim 1 wherein the recycled sulfide-free carbonic acid used to expel hydrogen sulfide includes sulfurous acid.

5. A method for treating a melt soda solution containing alkali and sulfide sulfur with a minimum of thiosulfate formation which comprises the steps of: (1) expelling sulfide sulfur from said solution as hydrogen sulfide in the form of a substantially oxygen-free gaseous mixture consisting essentially of hydrogen sulfide and carbonic acid by treating said solution with oxygen-free, substantially pure carbonic acid, whereby a substantially sulfide-free solution is obtained; (2) reacting said gaseous mixture of hydrogen sulfide and carbonic acid with sulfurous acid whereby elemental sulfur and substantially sulfide-free carbonic acid are obtained; and (3) directly recycling the thus obtained sulfide-free carbonic acid to step (1) for the treatment of additional melt soda solution and the expulsion of sulfide sulfur therefrom.

6. The method of claim 1 wherein the sulfide-free solution obtained in step (1) contains carbonate, carbonic acid is liberated therefrom and the thus liberated carbonic acid is recycled to step (1) for the treatment of additional melt soda solution.

References Cited in the file of this patent

UNITED STATES PATENTS

| | | |
|---|---|---|
| 2,047,032 | Richter | July 7, 1936 |
| 2,177,707 | Gaither | Oct. 31, 1939 |
| 2,656,244 | Gray et al. | Oct. 20, 1953 |
| 2,675,297 | Gray et al. | Apr. 13, 1954 |